United States Patent
Pierce et al.

(10) Patent No.: US 6,223,035 B1
(45) Date of Patent: *Apr. 24, 2001

(54) METHOD AND APPARATUS FOR PROVIDING A SUBSCRIBER RECORD FOR PACKET DATA REGISTRATION OF A MOBILE STATION

(75) Inventors: Jennifer A. Pierce, Algonquin; Timothy J. Wilson, Rolling Meadows, both of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,383

(22) Filed: Sep. 30, 1997

(51) Int. Cl.[7] .................................................. H04Q 7/20
(52) U.S. Cl. .................. 455/433; 455/426; 455/432; 455/517; 455/560
(58) Field of Search ................................ 455/433, 432, 455/422, 426, 435, 436, 507, 517, 524, 525, 560, 561; 370/352, 389, 400, 401

(56) References Cited

U.S. PATENT DOCUMENTS

| | | | | |
|---|---|---|---|---|
| 5,142,654 | * | 8/1992 | Sonberg et al. | 455/433 |
| 5,345,502 | * | 9/1994 | Rothenhofer | 455/433 |
| 5,548,631 | | 8/1996 | Krebs et al. . | |
| 5,590,133 | | 12/1996 | Billström et al. . | |
| 5,819,178 | * | 10/1998 | Cropper | 455/435 |

* cited by examiner

Primary Examiner—Doris H. To
(74) Attorney, Agent, or Firm—Scott M. Garrett

(57) ABSTRACT

A communications system for providing packet data service to mobile stations (110) performs registration of the mobile station prior to engaging in packet data service. The registration procedure includes sending a request to register (300) to a DAP (113), transferring (302) subscriber data from a HLR (124) to a D-VLR (126), authenticating (306) the mobile subscriber, selecting a mobile data gateway (116) to service the mobile station, transferring (308) the subscriber data from the D-VLR to the mobile data gateway, and establishing (312) a packet data link between the mobile data gateway and the mobile station.

5 Claims, 3 Drawing Sheets

METHOD AND APPARATUS FOR PROVIDING A SUBSCRIBER RECORD FOR PACKET DATA REGISTRATION OF A MOBILE STATION

TECHNICAL FIELD

The invention relates in general to wireless communications system infrastructure, and more particularly to wireless communications systems offering packet data service to mobile stations.

BACKGROUND

Mobile data communications is rapidly becoming one of the fastest growing segments of the mobile communications market. A strong driving force is the fast growing portable computing market and the need for flexible wireless data communications it creates. This market force is further emphasized by the smaller, more personal oriented computing devices, such as Personal Digital Assistants (PDAs), and other so called palm top computing devices. With PDAs and other such personal computing devices, as well as with more conventional portable computers, it is possible to send and receive electronic mail, facsimiles, and even browse public information networks such as the world wide web. As these activities become popular for mobile equipment users, so too will the demand for mobile wireless data services.

At the same time, other types of mobile communications services are also in increased demand. These other services include mobile telephone interconnect service, such as cellular telephone, and dispatch radio service, for example. Typically these types of services are provided with separate equipment. That is, traditionally, dispatch and telephone interconnect systems have been separate systems, each requiring fixed and mobile equipment. However, there has been a move underway to provide multiple communications services to mobile users using common mobile and fixed equipment. These are the so called integrated services radio networks, an excellent example of which is found in U.S. Pat. No. 5,548,631 to Krebs et al. These systems use digital modulation for the radio channel, and are typically time divisioned to allow multiple channels on a single frequency or pair of frequencies.

Mobile data service, or packet data, as it is sometimes referred, has been added to cellular telephone service such as GSM. An example of which can be found in U.S. Pat. No. 5,590,133 to Billström et al. However, to date, packet data service has not been made available commercially in integrated services radio networks. In doing so, a number of problems are presented, and chief among these is the registration of mobile subscriber units or mobile stations for packet data service.

In a typical communications equipment network a subscriber data base is maintained that includes provisioning information, feature activation status, and so forth This database is typically referred to as a home location register (HLR), and is well understood. Upon receiving a request for registration from a mobile station, the network equipment will access the HLR, find the correlating subscriber record, and determine what features to activate for the mobile station, as well as the necessary authentication information, among other pertinent information. This information is transferred to another database called the visit location register (VLR), which is also well understood in the art. The VLR is used by the system to also track the location in the system of the mobile station. That is, what particular cell or cells the mobile station was most recently in, so that an incoming call may be routed correctly.

In adding any service such as packet data service to a communications network, a VLR function is also necessary to track mobile stations within the serving area. This will allow the system to, for example, send notifiers that the system has received email for the mobile station. Therefore, there is a need, in an integrated services radio system, for a means by which a mobile station can register for packet data service, and for a means by which the serving equipment can track the mobile station.

DETAILED DESCRIPTION OF THE PREFERRED EMBODIMENT

Figure 1:
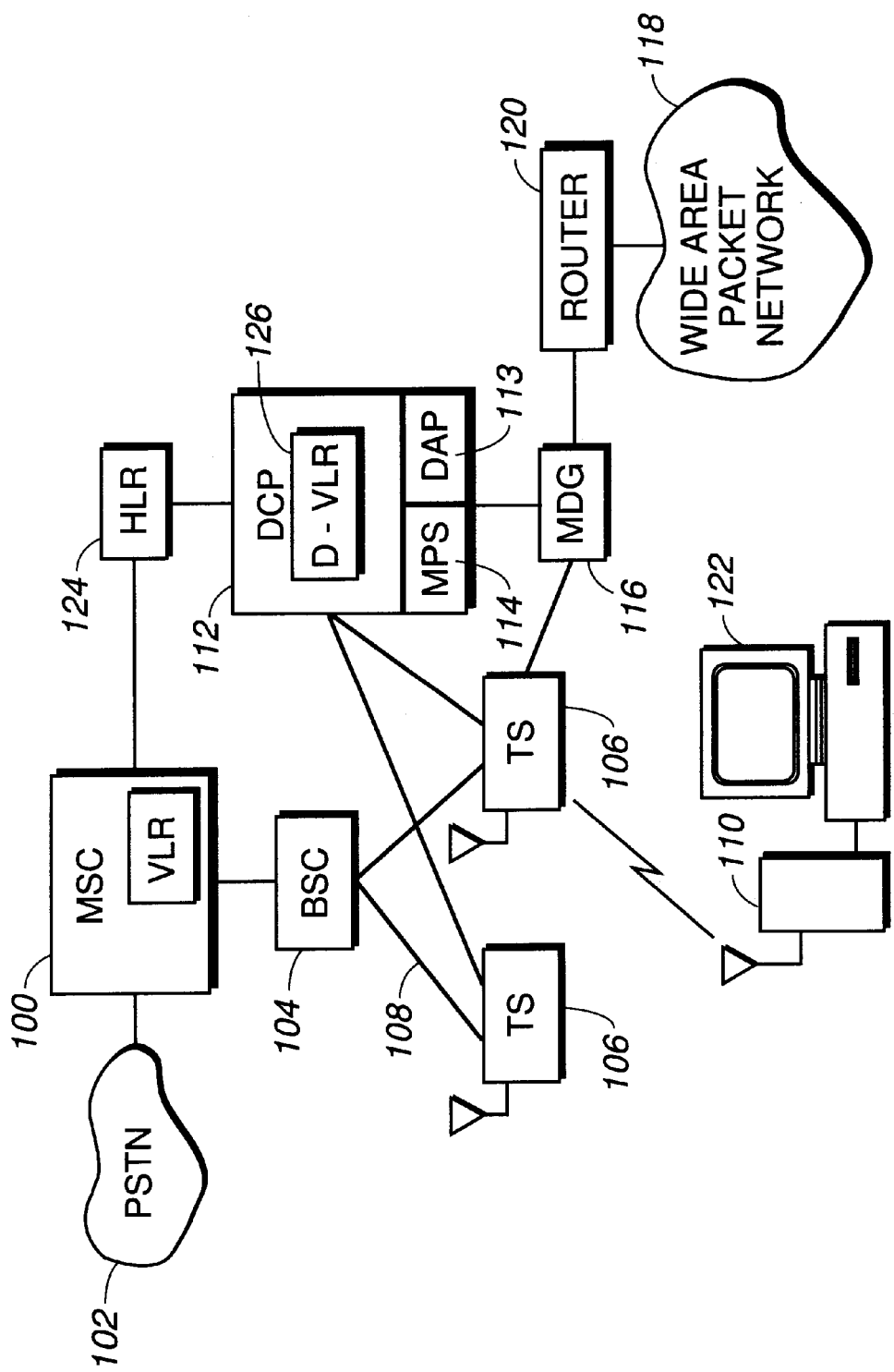
FIG. 1 shows a block diagram of a general integrated services radio system in accordance with the invention.

While the specification concludes with claims defining the features of the invention that are regarded as novel, it is believed that the invention will be better understood from a consideration of the following description in conjunction with the drawing figures, in which like reference numerals are carried forward.

Whenever new services are added to existing mobile communications services, there is a problem in that care must be taken to insure that mobile station's locations within the serving area are known. This must initially be set up during registration of each mobile subscriber. As mobile stations change cells during service use, the system must be able to track the mobile station. To avoid unnecessary system complexity, it is desirable that the equipment responsible for providing the service have a means for tracking a mobile station's location. Herein such a system and means are described. Specifically, a multi-tiered visit location register approach is used, wherein a home location register provides a subscriber record to a first entity, and upon request, the first entity provides the same information to a second entity. In the preferred embodiment, the first entity is a dispatch control processor and the second entity is a mobile data gateway for providing packet data service to mobile station.

Referring now to FIG. 1, which shows a block diagram of a general integrated services radio system in accordance with the invention. In the preferred embodiment, the system provides at least telephone interconnect service and dispatch voice service, as well as packet data service. Telephone interconnect service is provided in a manner similar to GSM cellular, as is well known in the art. A mobile switching center (MSC) 100 is connected to a public switched telephone network 102 and a plurality of base site controllers (BSC), such as base site controller 104. Each base site controller is operably coupled to a plurality of transceiver sites (TS) 106, preferably by an ethernet bus 108. The transceiver sites contain radio transmitters and receivers configured to communicate with mobile stations, such as mobile station 110, on channels that are defined in frequency and in time, such as with time division multiple access (TDMA) and time division multiplex (TDM) schemes. In general, the mobile stations are typically either hand held radio devices, or automobile mounted radio devices, as with cellular telephone equipment.

To provide dispatch voice service, a dispatch control processor (DCP) 112 is provided. The DCP comprises equipment and resources for processing dispatch requests, such as a dispatch applications processor (DAP) 113, and equipment for duplicating and transmitting voice packets to various parts of the network, such as a metropolitan packet switch (MPS) 114, to allow a user to communicate with an individual user or selected group of users in a dispatch mode. The DCP is operably coupled to the transceiver sites to send and receive traffic and control data over the network.

To provide packet data service, a mobile data gateway (MDG) 116 is provided. The MDG is operably coupled to a wide area packet network (WAPN) 118, such as the public internet, through a routing network 120. The routers exchange and route data with the WAPN in a conventional manner. The MDG is operably coupled to the transceiver sites, and communicates with the mobile stations by using, for example, mobile internet protocol. In this manner, packet data is communicated between the mobile station and the WAPN. The mobile station may either be the user of the service, as when retrieving and displaying email text messages, or may act as a data modem for another computing device, such as a portable computer 122.

Prior to providing any service to a mobile station, the system must first verify and authenticate the mobile station. This process is known in the art as registration. To facilitate registration, it is necessary that a record correlating to the mobile station be kept. Such records are typically stored in a non-volatile database referred to as a home location register (HLR) 124. In a typical registration process the mobile station first scans the airwaves to find a control channel, over which system and location specific information is broadcast. The mobile station then sends a request to register to the appropriate network entity. For telephone interconnect service, for example, the request is sent to the MSC. Upon receiving the request, the MSC obtains the record for the mobile station from the HLR. The record is stored in a visit location register (VLR), as is well known in the art, and the VLR record is further used to update location information of the mobile station. Upon successfully authenticating the mobile station, telephone interconnect service is then provided. For dispatch registration, the process is very similar. The mobile station sends a request to register to the DAP 113, which then obtains the mobile subscriber's record from the HLR. The DCP has a visit location register as well, and is referred to as a D-VLR 126. The D-VLR functions and serves the same purpose as in the MSC.

In providing packet data service, it is also necessary for a mobile station to register, and for the system to keep a record of the mobile stations location as it changes location within the serving area of the system. In the preferred embodiment, the mobile station first registers for dispatch service. The DAP, once it receives the mobile station's record from the HLR, passes information to the MDG. In a sense, the D-VLR acts as an HLR to the MDG. The MDG then retains the information locally.

Figure 2:
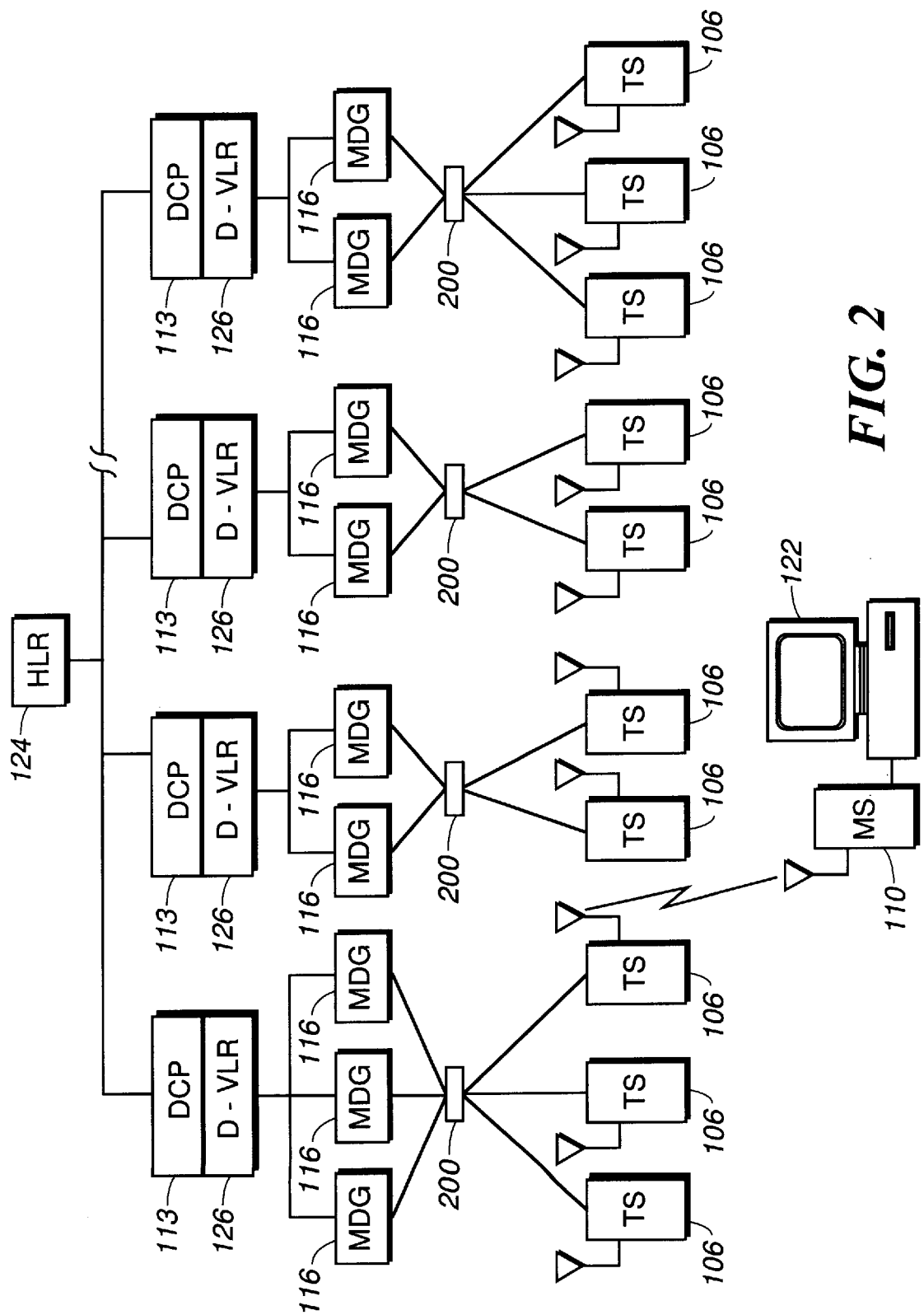
FIG. 2 shows a more detailed block diagram of an integrated services radio system in accordance with the invention.

Referring now to FIG. 2, there is shown a more detailed block diagram of an integrated services radio system in accordance with the invention. This diagram offers a more practical system view. In a system serving large metropolitan regions, there will be multiple network entities at all levels to provide the necessary capacity capability. For example, in this diagram there is a plurality of dispatch application processors, each with it's own D-VLR 126. Coupled to each DAP there will likely be a plurality of mobile data gateways 116. By providing multiple MDGs, the system owner can offer higher capacity data transmission, commonly referred to as bandwidth. In practice, upon successfully registering for packet data service, the DAP will select and assign a MDG to serve the mobile station. In that way, the data traffic load can be balanced between the MDGs. Each MDG is connected to all of the transmitter sites 106 in the serving area, preferably through an access controller gateway 200. Thus, the invention provides for a two tiered VLR configuration; the MDG operates with the D-VLR similarly to how the D-VLR operates with the HLR.

In operating a mobile communications system, there are many events that may occur relating to the registration process. The following examples serve to illustrate how the invention operates under specific conditions. First, when a mobile subscriber needs to be authenticated, the D-VLR requests the appropriate authentication sets from the HLR. The HLR returns them, and includes an encryption key, as is known in the art. The D-VLR then passes the encryption key to the MDG. The encryption key is used by the MDG to perform over the air encryption of the data it transmits to the mobile station, and the mobile station may do the same in transmitting data to the MDG. Second, in retrieving the necessary information to register a mobile station in a new serving area, the new D-VLR indicates the change to the HLR, and the HLR returns the subscriber record for retention at the new D-VLR, which then passes the change to the MDG serving the mobile station. Third, changes to subscriber records, such as those made by craft persons, are made at the HLR Any such changes propagate from the HLR to the D-VLR to the MDG. In other words, the change triggers the HLR to communicate to the D-VLR, and indicate the change, and the D-VLR does the same with the MDG. Fourth: traditionally the DVLR stores subscriber records in a volatile storage means, such as a RAM. However, as the D-VLR acts as an HLR to the MDG, it is important that non-volatile storage is provided, such as a hard disk drive. This provides a measure of protection should the MDG need to recover the information for any reason. Additionally, by providing the D-VLR with a non-volatile memory means, it can be used to backup state information of the MDGs, and the state of the data that the HLR contains to mediate data deviations between the MDG and the HLR.

Figure 3:
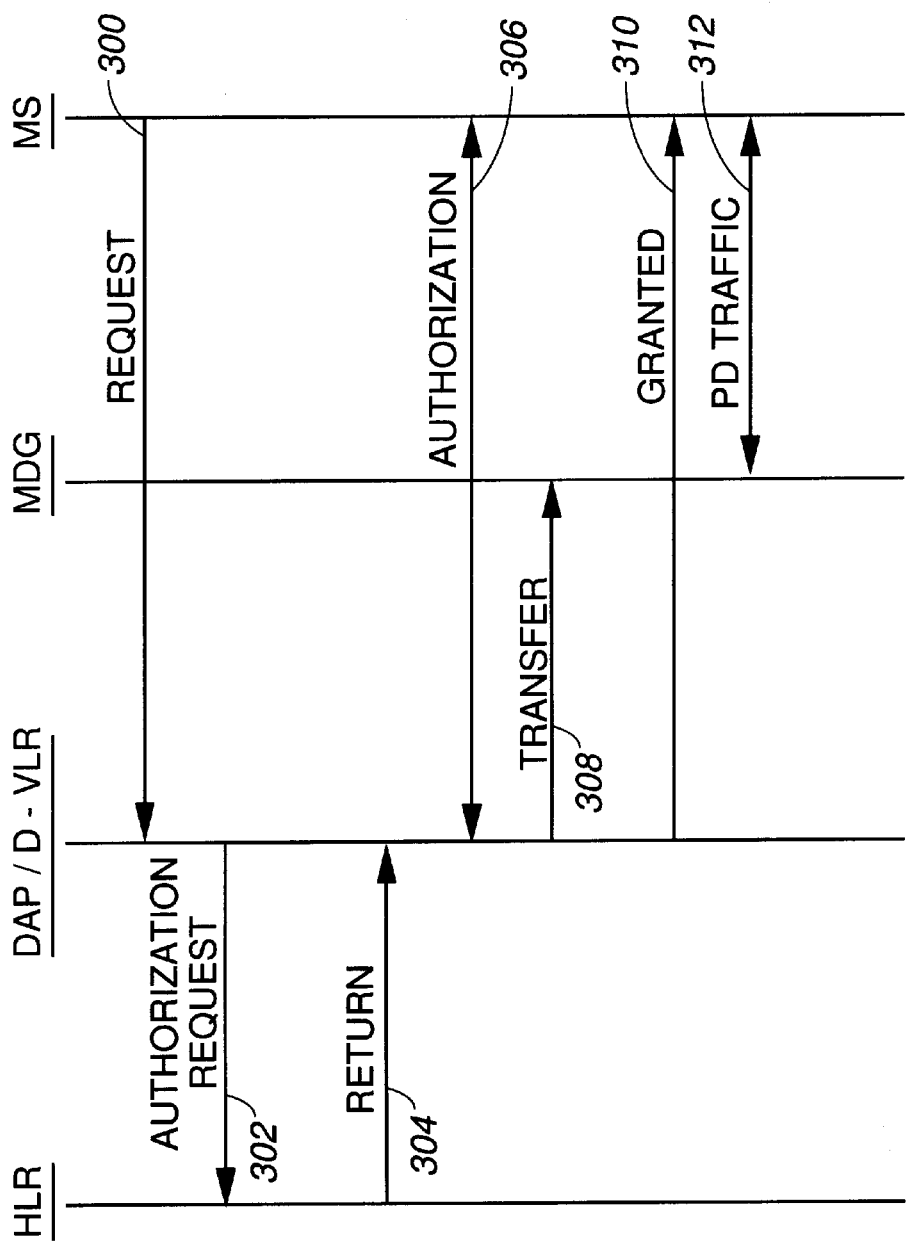
FIG. 3 shows a signaling diagram of a registration process in accordance with the invention.

Referring now to FIG. 3, there is shown a signaling diagram of a registration process in accordance with the invention. The method includes first beginning with the mobile station (MS) sending a request to register 300 to the DAP/D-VLR. Then the D-VLR requests information 302, known as the subscriber record, from the HLR, the information includes authentication information and feature information. The authentication information is used to authenticate the mobile station, as is known in the art, and the feature information is used to determine what features and services the mobile station is granted by the system. The feature information will indicate if the mobile station may engage in packet data service, for example. The HLR then transfers the subscriber record 304 to the D-VLR. The DAP uses the authentication information to authenticate the mobile station 306. In the preferred embodiment, after this step, a messaging session between the DAP and the HLR occurs in accordance with GSM specifications, and includes messages such as UPDATE_LOCATION, and acknowledgments. Upon successfully authenticating the mobile station, the DAP selects an MDG to service the mobile station, and the D-VLR passes 308 location information and, optionally, an encryption key code to the selected MDG. This step may be performed either automatically by the system, or in response to the mobile station requesting additional services, such as packet data. The DAP then grants 310 system access to the mobile station, and in so doing, passes the necessary channel and network information to the mobile station. Finally, the mobile station engages 312 the MDG in a packet data communication. In the preferred embodiment, the mobile station, after successfully registering for dispatch service, requests registration for packet data service, which triggers the DAP to transfer the necessary subscriber record to the MDG.

In summary, the preferred method includes the steps of: registering for a first service, the first service being provided by a first network entity having a VLR; sending a request to register for the additional service, the additional service provided by a second network entity operably coupled to the first network entity; transferring a subscriber record from the first network entity to the second network entity; and establishing service between the mobile station and the second network entity. In the preferred embodiment, the steps become: sending a request to register for packet data service from the mobile subscriber to the dispatch application processor; transferring a subscriber record corresponding to the mobile subscriber from a home location register to a visit location register operably connected to the dispatch applications processor; selecting a mobile data gateway to service the mobile subscriber, performed by the dispatch application processor; transferring the subscriber record corresponding to the mobile subscriber from the visit location register to the mobile data gateway; and establishing a packet data link between the mobile subscriber and the mobile data gateway in accordance with the subscriber record.

Thus, the invention provides a communications system providing multiple communications service with a method and apparatus for providing subscriber data for another service's registration of a mobile station. In the preferred embodiment, a method of registering a mobile subscriber for a packet data service was discussed. Specifically, there is provided a two tiered VLR scheme where one VLR, the D-VLR acts as conventional VLR to a conventional HLR, and as an HLR to a network entity, such as a mobile data gateway (MDG), for example. This arrangement allows the MDG to send incoming packet data packets to the correct transceiver site for transmission to the mobile station without having to request the information from a HLR. Although a packet data service has been shown in the preferred embodiment, it is contemplated that the multi-tiered VLR scheme can be used for many over-laid network services, examples of which include location tracking equipment for tracking a mobile stations location within a cell. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of registering a mobile station for packet data service, the method comprising the steps of:

transferring a subscriber record corresponding to the mobile subscriber from a home location register to a dispatch visit location register operably connected to the dispatch applications processor;

selecting a mobile data gateway to service the mobile subscriber, performed by the dispatch application processor;

transferring the subscriber record corresponding to the mobile subscriber from the dispatch visit location register to the mobile data gateway; and establishing a packet data link between the mobile subscriber and the mobile data gateway in accordance with the subscriber record; and wherein the dispatch visit location register acts as a home location register for the mobile data gateway.

2. A method as in claim 1, further comprising the step of sending a request to register for packet data service from the mobile subscriber to the dispatch application processor prior to performing the step of transferring a subscriber record from a home location register to a visit location register.

3. A mobile communications system for providing both dispatch and packet data service, comprising:

a home location register for storing a plurality of subscriber records;

a dispatch control processor for providing dispatch service, operably coupled to the home location register, and having a dispatch visit location register for storing a plurality of subscriber records;

at least one mobile data gateway operably coupled to the dispatch control processor, and having a means for storing a plurality of subscriber records wherein the dispatch visit location register acts as a home location register for the at least one mobile data gateway.

4. A mobile communications system as recited in claim 3, wherein the mobile data gateway is operably coupled to a wide area packet network through a router network.

5. A mobile communications system as recited in claim 3, further comprising a mobile switching center operably coupled to the home location register for providing telephone interconnect service.

* * * * *